United States Patent Office 3,826,680
Patented July 30, 1974

3,826,680
METHOD FOR PREPARING POLYMER IMPREGNATED CEMENT ARTICLES
Arturo Rio, Marcello Cerrone, and Alberto Saini, Colleferro, Italy, assignors to Società Italiana per Azioni per la Produzione di Calci e Cementi di Segni, Rome, Italy
No Drawing. Filed Jan. 25, 1972, Ser. No. 220,690
Claims priority, application Italy, Jan. 27, 1971, 47,996/71
Int. Cl. B32b *13/12;* B44d *1/44*
U.S. Cl. 117—119.6                                    1 Claim

ABSTRACT OF THE DISCLOSURE

A method for preparing polymer impregnated cement articles wherein a pre-formed cement article is impregnated with a liquid polymerizable composition, then immersed in water, heated at a temperature required for the polymerization of said polymerizable composition maintaining the impregnated cement article at such a temperature until polymerization in situ of the monomer has been completed.

---

The present invention relates to an improved method for production of hydrosilicate binder base compound articles of manufacture, and to the products thereby obtained.

It is known that the cement mixes, even if they can be considered excellent building materials suitable for multiple applications, show certain limitations which depend upon their own nature and which will limit their use to those cases where the system is subjected to particular chemical and/or physical-mechanical stresses.

It is also known to impregnate the aforesaid mixes with substance subsequently polymerized in situ obtaining thereby compound materials which owing to the increment of compactness and of chemical and mechanical strength deriving from the imbibition with resin, show the aforesaid limitations remarkably reduced with the consequent possibility of largely extending the field of application of the articles of manufacture.

In the choice of the polymerizable substances to be utilized for impregnating the product, it is necessary to take account of all a set of factors, of both technical and economical nature, in relation to the anticipated use of the article of manufacture.

Under the standpoint of the chemical-physical features, the attention has been preferably directed to liquid monomers having a relatively low viscosity such as for instance styrene, acrylic and methacrylic esters, vinyl esters etc., so as to ensure a satisfactory penetration inside the manufactured product. Even if said monomers will ensure a good degree of inhibition in relatively short times, when the polymerization has been completed, an incomplete and non homogeneous surface coating of the manufactured products will be often obtained, and this of course produces a minor waterproofing feature and chemical strength of the compound articles of manufacture.

In order to obviate this drawback, due to the surface evaporation of the monomer during the thermopolymerization, certain contrivances have been adopted, which however have not satisfactorily solved the problem. For instance, the manufactured article impregnated with the monomer will be immersed in a concentrated solution of a polymer in the monomer and then wrapped, before the polymerization, by aluminum foils, or polyethylene foils etc.

Notwithstanding the complexity and difficulty of the operations as above cursorily cited, the entire operation of imbibition and polymerization appears not to lose entirely certain characters of casualness concerning the amount of impregnation, as it results from both the variable weight increase shown by the manufactured product when the operation is completed and concerning the amount of supported and polymerized monomer, and from the very differentiated response shown by the so prepared article of manufacture during its application stage.

In view of the above, the present invention relates to an improved method for preparing compound articles of manufacture, allowing the complete removal of the aforesaid drawbacks due to the evaporation of the monomer at the surface of the manufactured products during the polymerization. This method can be applied to the production of the compound articles of manufacture based on hydrosilicate binders of each kind, as the cement products, the autoclave treated silicate products and those concerned with the asbestos cement.

The method according to this invention is essentially characterized in that the articles of manufacture of the concerned kind, after the impregnation with the polymerizable substance, are submitted to polymerization being immersed in a bath of a suitable liquid medium, non solvent of the monomer, and kept at the required temperature for the polymerization of the used monomer.

As polymerization bath, the water is used advantageously in many cases, but it is possible to use also glycerin, mineral oils or other suitable liqudi mediums, wherein, of course, the monomer used for the impregnation must show a negligible solubility.

By operating according to the method of this invention, besides reducing almost completely the evaporation of the monomer at the surface of the articles of manufacture, there is also the advantage that the compound articles of manufacture thus obtained have outer surfaces perfectly smooth, such as to require no finishing operation before their use as it is, on the contrary, necessary in the compound articles of manufacture prepared according to the prior art.

The following examples serve to illustrate further the present invention, without thereby limiting it. The percents shown in the examples are by weight, in base to the total amount, except when a different indication is expressly shown.

Example 1

Articles of manufacture of concrete, prepared as follows:

binder consisting of a mix in the ratio: 70:30 of portland cement with a high silicic modulus (3.10) and a low fluxing modulus (1.3), and of sand with an high $SiO_2$ content (90%)
inerts of basaltic nature corresponding, as far as the grain size is concerned, to the Füller curve
$(P=100\sqrt{d/D})$ with a maximum diameter of the aggregate 10 mm.
  ratio by weight binder/inerts=1:5
  ratio water/binder=0.50
submitted to the ageing modes as follows:
(a) pre-ageing through 12 hours at the room temperature
(b) treatment for three hours in autoclave at 215° C. (20 atm.)
(c) thermol treatment under the atmospheric pressure at the temperature of 200° C. for a term of 4 hours, showed after the aforesaid treatments a mechanical strength of 1.250 kg./cm.$^2$.

After imbibition by immersion in suitably additioned methyl-methacrylate (0.1% dimethylaniline+1% benzoylperoxide) in the autoclave a pressure has been applied of 50 atmospheres (N$_2$) so as to complete quickly the penetration of the monomer.

After impregnation, in order to reduce to minimum the losses by evaporation of the monomer during the thermopolymerization, one part of the articles of manufacture has been immersed into water, maintained at a constant temperature of 80° C. for 10 hours, while the othre articles of manufacture after immersion into a solution of polymethylmethacrylate (15%) in monomer have been wrapped in aluminum sheets and then thermally treated at 70° C. for 10 hours.

The average variations in the amount of supported monomer ($\Delta W$) and the standard deviations or relative dispersions related to this amount, found at the end of the two different treatments are as follows:

tests pieces thermopolymerized in water: $\overline{\Delta W}=2.1\%$
Standard deviation=0.011
tests pieces thermopolymerized in oven: $\overline{\Delta W}=3.4\%$
Standard deviation=0.057

Example 2

Articles of manufacture made of pozzolana cement A.R.C. (a high chemical resistance cement manufactured by the Applicants) and basalitic inerts corresponding as to the grain size to the Füller cure ($P=100\sqrt{d/D}$) with a maximum diameter of the aggregate of 10 mm., and with ratios: water/cement=0.5 and binder/inert=0.2, submitted to the ageing modes as shown in Example No. 1, show a mechanical strength of 1,260 kg./cm.$^2$.

The articles of manufacture, submitted to the subsequent treatments of impregnation and polymerization, using styrene as monomer and with the same modes as described in Example 1, show the average variations in the amount of supported monomer and the standard deviations as follows:

Tests pieces thermopolymerized in water: $\overline{\Delta W}=1.9\%$
Standard deviation=0.013
Tests pieces thermopolymerized in oven: $\overline{\Delta W}=3.4\%$
Standard deviation=0.052

Example No. 3

Articles of manufacture of asbestos cement, after having been submitted to a drying process for three hours at 200° C., have been impregnated with methyl methacrylate and subsequently submitted to polymerization.

As shown in Example No. 1, one part of the articles of manufacture has been immersed in water, maintained at 80° C. for 10 hours, while the others, after immersion in the polymer solution have been wrapped in aluminum sheets and thermopolymerized.

The average variations in the amount of supported polymer, and the following standard variations have been found:

Tests pieces thermopolymerized in water: $\overline{\Delta W}=1.2\%$
Standard deviation=0.011
Tests pieces thermopolymerized in oven: $\overline{\Delta W}=3.5\%$
Standard deviation=0.059

Having thus described the present invention, what is claimed is:

1. A method of producing polymer impregnated concrete articles which comprises impregnating a preformed concrete article with a liquid polymerizable composition, said liquid polymerizable composition containing (a) small amounts of dimethylaniline and benzoylperoxide and (b) liquid monomers, said liquid monomers selected from the group consisting of styrene, acrylic esters, methacrylic esters and vinyl esters; immersing the impregnated article in water heated to temperatures of approximately 80° C. to polymerize said polymerizable composition; and maintaining the article under these conditions until said polymerizable composition has polymerized in situ.

References Cited

UNITED STATES PATENTS

| | | | |
|---|---|---|---|
| 2,772,185 | 11/1956 | Dempster | 117—102 R |
| 3,597,262 | 8/1971 | Bader et al. | 117—148 |
| 3,567,496 | 3/1971 | Steinberg et al. | 117—123 D |

FOREIGN PATENTS

| | | | |
|---|---|---|---|
| 2,111,149 | 9/1971 | Germany | 117—123 D |

OTHER REFERENCES

Chemical Abstracts, Vol. 71; p. 91935, 1969.
Chemical Abstracts, Vol. 73, 56488 q, 1970.
DiKeow, J. T., et al., "Polymerization Makes Concrete Tougher," in *American Concrete Institute Journal*, October 1969, pp. 829–839.

WILLIAM D. MARTIN, Primary Examiner
W. H. SCHMIDT, Assistant Examiner

U.S. Cl. X.R.

117—123 C, 123 D, DIG. 3